(12) United States Patent
den Boer et al.

(10) Patent No.: US 8,267,241 B2
(45) Date of Patent: Sep. 18, 2012

(54) ROTATIONALLY INDEXED ARTICLE SUPPORT FOR A CONVEYOR SYSTEM HAVING AN ALIGNMENT STATION

(75) Inventors: Mark Thomas Gustaaf den Boer, Roosendaal (NL); Juul Floris van den Berg, Roosendaal (NL); Arij de Vrij, Numansdorp (NL)

(73) Assignee: Foodmate BV (NL)

( * ) Notice: Subject to any disclaimer, the term of this patent is extended or adjusted under 35 U.S.C. 154(b) by 6 days.

(21) Appl. No.: 13/014,261

(22) Filed: Jan. 26, 2011

(65) Prior Publication Data

US 2012/0186941 A1    Jul. 26, 2012

(51) Int. Cl.
*B65G 17/46* (2006.01)
(52) U.S. Cl. .................. 198/679; 198/680; 198/682
(58) Field of Classification Search ............ 198/678.1, 198/683, 684, 685, 679, 680, 465.4, 682
See application file for complete search history.

(56) References Cited

U.S. PATENT DOCUMENTS

| | | | |
|---|---|---|---|
| 1,730,382 A * | 10/1929 | Posnick | 198/465.4 |
| 2,526,253 A * | 10/1950 | Merrill | 198/679 |
| 3,847,269 A * | 11/1974 | Buccicone | 198/679 |
| 3,956,794 A | 5/1976 | Verbakel | |
| 3,969,790 A | 7/1976 | Smorenburg | |
| 3,979,793 A | 9/1976 | Hazenbroek | |
| 3,983,601 A | 10/1976 | Verbakel | |
| 3,990,128 A | 11/1976 | van Mil | |
| 4,034,440 A | 7/1977 | van Mil | |
| 4,118,829 A | 10/1978 | Harben, Jr. | |
| 4,131,973 A | 1/1979 | Verbakel | |
| 4,147,012 A | 4/1979 | van Mil | |
| 4,153,971 A | 5/1979 | Simonds | |
| 4,153,972 A | 5/1979 | Harben et al. | |

(Continued)

FOREIGN PATENT DOCUMENTS

DE    603 16 104 T2    6/2008

(Continued)

OTHER PUBLICATIONS

International Search Report and Written Opinion dated Jan. 20, 2012 for NL2006075.

(Continued)

*Primary Examiner* — James R Bidwell
(74) *Attorney, Agent, or Firm* — Womble Carlyle Sandridge & Rice LLP

(57) ABSTRACT

An article support assembly (1) is adapted for movement by a conveyor along a path of conveyance. The article support assembly (1) includes a trolley (5) for engagement by the conveyor and a shackle (3) configured to support an article, and rotatable with respect to the trolley. A turning block (33) is associated with the shackle (3), and rotation of the turning block with respect to the trolley (5) causes corresponding rotation of the shackle relative to the trolley. Yieldable indexing features (23, 27, 29, 31) are operatively arranged between the trolley (5) and the turning block (33) to define at least a first and a second incremental rotational position or orientation for the shackle (3). The yieldable indexing features (23, 27, 29, 31) of the article support assembly (1) are biased into yieldable engagement by magnetic repelling forces. A conveyor system for conveying articles along processing stations is adapted to include the article support assembly (1) and comprises a turning station (43A, 43B, 43C, 43D) for giving a predetermined rotational orientation to the shackle (3) with respect to the trolley (5).

13 Claims, 5 Drawing Sheets

U.S. PATENT DOCUMENTS

| | | | |
|---|---|---|---|
| 4,178,659 A | 12/1979 | Simonds | |
| 4,180,152 A | 12/1979 | Sefcik | |
| 4,203,178 A | 5/1980 | Hazenbroek | |
| 4,283,813 A | 8/1981 | House | |
| 4,292,709 A | 10/1981 | van Mil | |
| 4,388,811 A | 6/1983 | Zebarth | |
| 4,395,795 A | 8/1983 | Hazenbroek | |
| 4,406,037 A | 9/1983 | Hazenbroek | |
| 4,418,444 A | 12/1983 | Meyn et al. | |
| 4,418,445 A | 12/1983 | Meyn et al. | |
| 4,434,526 A | 3/1984 | van Mil | |
| 4,439,891 A | 4/1984 | van Mil | |
| 4,468,838 A | 9/1984 | Sjöström et al. | |
| 4,490,922 A * | 1/1985 | Gorodetsky et al. | 198/679 |
| 4,510,886 A | 4/1985 | van Mil | |
| 4,514,879 A | 5/1985 | Hazenbroek | |
| 4,516,290 A | 5/1985 | van Mil | |
| 4,524,489 A | 6/1985 | van Mil | |
| 4,558,490 A | 12/1985 | Hazenbroek et al. | |
| 4,559,672 A | 12/1985 | Hazenbroek et al. | |
| 4,567,624 A | 2/1986 | van Mil | |
| 4,570,295 A | 2/1986 | van Mil | |
| 4,574,429 A | 3/1986 | Hazenbroek | |
| 4,577,368 A | 3/1986 | Hazenbroek | |
| D283,289 S | 4/1986 | Hazenbroek | |
| 4,593,432 A | 6/1986 | Hazenbroek | |
| 4,597,133 A | 7/1986 | van de Nieuwelaar | |
| 4,597,136 A | 7/1986 | Hazenbroek | |
| 4,635,317 A | 1/1987 | van der Eerden | |
| 4,639,973 A | 2/1987 | van der Eerden | |
| 4,639,974 A | 2/1987 | Olson | |
| 4,639,975 A | 2/1987 | van der Eerden | |
| 4,646,384 A | 3/1987 | van der Eerden | |
| 4,651,383 A | 3/1987 | van der Eerden | |
| 4,653,147 A | 3/1987 | van der Eerden | |
| 4,682,386 A | 7/1987 | Hazenbroek et al. | |
| 4,704,768 A | 11/1987 | Hutting et al. | |
| 4,723,339 A | 2/1988 | van de Nieuwelaar et al. | |
| 4,724,581 A | 2/1988 | van de Nieuwelaar | |
| 4,736,492 A | 4/1988 | Hazenbroek | |
| RE32,697 E | 6/1988 | Hazenbroek et al. | |
| 4,765,028 A | 8/1988 | van de Nieuwelaar et al. | |
| 4,766,644 A | 8/1988 | van den Nieuwelaar et al. | |
| 4,769,872 A | 9/1988 | Hazenbroek et al. | |
| 4,779,308 A | 10/1988 | van de Nieuwelaar et al. | |
| 4,788,749 A | 12/1988 | Hazenbroek et al. | |
| 4,811,456 A | 3/1989 | Heuvel | |
| 4,811,458 A | 3/1989 | v.d. Nieuwelaar et al. | |
| 4,811,462 A | 3/1989 | Meyn | |
| 4,813,101 A | 3/1989 | Brakels et al. | |
| 4,884,318 A | 12/1989 | Hazenbroek | |
| 4,893,378 A | 1/1990 | Hazenbroek | |
| 4,894,885 A | 1/1990 | Markert | |
| 4,896,399 A | 1/1990 | Hazenbroek | |
| 4,899,421 A | 2/1990 | Van Der Eerden | |
| 4,918,787 A | 4/1990 | Hazenbroek | |
| 4,928,351 A | 5/1990 | van den Nieuwelaar et al. | |
| 4,935,990 A | 6/1990 | Linnenbank | |
| 4,939,813 A | 7/1990 | Hazenbroek | |
| 4,958,694 A | 9/1990 | van den Nieuwelaar et al. | |
| 4,965,908 A | 10/1990 | Meyn | |
| 4,972,549 A | 11/1990 | van Den Nieuwelaar et al. | |
| 4,993,113 A | 2/1991 | Hazenbroek | |
| 4,993,115 A | 2/1991 | Hazenbroek | |
| 5,001,812 A | 3/1991 | Hazenbroek | |
| 5,013,431 A | 5/1991 | Doets | |
| 5,015,213 A | 5/1991 | Hazenbroek | |
| 5,019,013 A | 5/1991 | Hazenbroek | |
| 5,026,983 A | 6/1991 | Meyn | |
| 5,035,673 A | 7/1991 | Hazenbroek | |
| 5,037,351 A | 8/1991 | van Den Nieuwelaar et al. | |
| 5,041,054 A | 8/1991 | van den Nieuwelaar et al. | |
| 5,045,022 A | 9/1991 | Hazenbroek | |
| 5,060,596 A | 10/1991 | Esbroeck | |
| 5,064,402 A | 11/1991 | Koops | |
| 5,067,927 A | 11/1991 | Hazenbroek et al. | |
| 5,074,823 A | 12/1991 | Meyn | |
| 5,088,959 A | 2/1992 | Heemskerk | |
| 5,090,940 A | 2/1992 | Adkison | |
| 5,098,333 A | 3/1992 | Cobb | |
| 5,104,351 A | 4/1992 | van den Nieuwelaar et al. | |
| 5,122,090 A | 6/1992 | van den Nieuwelaar et al. | |
| 5,123,871 A | 6/1992 | van den Nieuwelaar et al. | |
| 5,125,498 A | 6/1992 | Meyn | |
| 5,147,240 A | 9/1992 | Hazenbroek et al. | |
| 5,147,241 A | 9/1992 | Rudin | |
| 5,154,664 A | 10/1992 | Hazenbroek et al. | |
| 5,154,665 A | 10/1992 | Hazenbroek | |
| RE34,149 E | 12/1992 | Markert | |
| 5,173,076 A | 12/1992 | Hazenbroek | |
| 5,173,077 A | 12/1992 | van den Nieuwelaar et al. | |
| 5,176,563 A | 1/1993 | van den Nieuwelaar et al. | |
| 5,176,564 A | 1/1993 | Hazenbroek | |
| 5,178,890 A | 1/1993 | van den Nieuwelaar et al. | |
| 5,186,679 A | 2/1993 | Meyn | |
| 5,188,559 A | 2/1993 | Hazenbroek | |
| 5,188,560 A | 2/1993 | Hazenbroek | |
| 5,194,035 A | 3/1993 | Dillard | |
| 5,197,917 A | 3/1993 | Verbakel et al. | |
| 5,199,922 A | 4/1993 | Korenberg et al. | |
| 5,222,905 A | 6/1993 | Van den Nieuwelaar et al. | |
| 5,242,324 A | 9/1993 | Koops | |
| 5,248,277 A | 9/1993 | Bos et al. | |
| 5,256,101 A | 10/1993 | Koops | |
| 5,269,721 A | 12/1993 | Meyn | |
| 5,277,649 A | 1/1994 | Adkison | |
| 5,277,650 A | 1/1994 | Meyn | |
| 5,279,517 A | 1/1994 | Koops | |
| 5,290,187 A | 3/1994 | Meyn | |
| 5,299,975 A | 4/1994 | Meyn | |
| 5,299,976 A | 4/1994 | Meyn | |
| 5,318,428 A | 6/1994 | Meyn | |
| 5,326,311 A | 7/1994 | Persoon et al. | |
| 5,334,083 A | 8/1994 | van den Nieuwelaar et al. | |
| 5,336,127 A | 8/1994 | Hazenbroek | |
| 5,339,941 A * | 8/1994 | Moll | 198/465.4 |
| 5,340,351 A | 8/1994 | Minderman et al. | |
| 5,340,355 A | 8/1994 | Meyn | |
| 5,342,237 A | 8/1994 | Kolkman | |
| 5,344,359 A | 9/1994 | Kolkman | |
| 5,344,360 A | 9/1994 | Hazenbroek | |
| 5,366,406 A | 11/1994 | Hobbel et al. | |
| 5,370,574 A | 12/1994 | Meyn | |
| 5,372,246 A | 12/1994 | van Aalst | |
| RE34,882 E | 3/1995 | Meyn | |
| 5,429,549 A | 7/1995 | Verrijp et al. | |
| 5,439,702 A | 8/1995 | French | |
| 5,453,045 A | 9/1995 | Hobbel et al. | |
| 5,462,477 A | 10/1995 | Ketels | |
| 5,470,194 A | 11/1995 | Zegers | |
| 5,487,700 A | 1/1996 | Dillard | |
| 5,505,657 A | 4/1996 | Janssen et al. | |
| 5,549,521 A | 8/1996 | van den Nieuwelaar et al. | |
| D373,883 S | 9/1996 | Dillard | |
| 5,569,067 A | 10/1996 | Meyn | |
| 5,595,066 A | 1/1997 | Zwanikken et al. | |
| 5,605,503 A | 2/1997 | Martin | |
| 5,643,072 A | 7/1997 | Lankhaar et al. | |
| 5,643,074 A | 7/1997 | Linnenbank | |
| 5,672,098 A | 9/1997 | Veraart | |
| 5,676,594 A | 10/1997 | Joosten | |
| 5,704,830 A | 1/1998 | Van Ochten | |
| 5,713,786 A | 2/1998 | Kikstra | |
| 5,713,787 A | 2/1998 | Schoenmakers et al. | |
| 5,741,176 A | 4/1998 | Lapp et al. | |
| 5,755,617 A | 5/1998 | van Harskamp et al. | |
| 5,759,095 A | 6/1998 | De Weerd | |
| 5,766,063 A | 6/1998 | Hazenbroek et al. | |
| 5,782,685 A | 7/1998 | Hazenbroek et al. | |
| 5,785,588 A | 7/1998 | Jacobs et al. | |
| 5,803,802 A | 9/1998 | Jansen | |
| 5,810,651 A | 9/1998 | De Heer et al. | |
| 5,810,653 A | 9/1998 | Van Craaikamp et al. | |
| 5,813,908 A | 9/1998 | Craaikamp | |
| 5,827,116 A | 10/1998 | Al et al. | |
| 5,833,527 A | 11/1998 | Hazenbroek et al. | |
| 5,865,672 A | 2/1999 | Hazenbroek | |

| | | |
|---|---|---|
| 5,875,738 A | 3/1999 | Hazenbroek et al. |
| 5,947,811 A | 9/1999 | Hazenbroek et al. |
| 5,951,393 A | 9/1999 | Barendregt |
| 5,969,652 A | 10/1999 | Hazenbroek |
| 5,975,029 A | 11/1999 | Morimoto et al. |
| 5,976,004 A | 11/1999 | Hazenbroek |
| 5,980,377 A | 11/1999 | Zwanikken et al. |
| 6,007,416 A | 12/1999 | Janssen et al. |
| 6,007,417 A | 12/1999 | Jones et al. |
| 6,024,636 A | 2/2000 | Hazenbroek et al. |
| 6,027,403 A | 2/2000 | Hazenbroek et al. |
| 6,027,404 A | 2/2000 | Wols |
| 6,029,795 A | 2/2000 | Janssen et al. |
| 6,033,299 A | 3/2000 | Stone et al. |
| 6,062,972 A | 5/2000 | Visser |
| 6,095,914 A | 8/2000 | Cornelissen et al. |
| 6,126,534 A | 10/2000 | Jacobs et al. |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt |
| 6,358,136 B1 | 3/2002 | Volk et al. |
| 6,371,843 B1 | 4/2002 | Volk et al. |
| 6,375,560 B1 | 4/2002 | Verrijp |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,599,179 B1 | 7/2003 | Hazenbroek et al. |
| 6,612,919 B2 | 9/2003 | Jansen et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 | 7/2004 | Hazenbroek et al. |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 | 1/2005 | Hetterscheid et al. |
| 6,899,613 B2 | 5/2005 | van den Nieuwelaar et al. |
| 6,912,434 B2 | 6/2005 | van den Nieuwelaar et al. |
| 6,986,707 B2 | 1/2006 | van den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,232,365 B2 | 6/2007 | Annema et al. |
| 7,232,366 B2 | 6/2007 | van den Nieuwelaar et al. |
| 7,249,998 B2 | 7/2007 | van Esbroeck et al. |
| 7,261,629 B2 | 8/2007 | Holleman |
| 7,284,973 B2 | 10/2007 | van Esbroeck et al. |
| 7,302,885 B2 | 12/2007 | Townsend |
| 7,344,437 B2 | 3/2008 | Van den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,494,406 B2 | 2/2009 | Van Esbroeck et al. |
| 7,530,888 B2 | 5/2009 | Annema et al. |
| 7,572,176 B2 | 8/2009 | Petersen et al. |
| 7,662,033 B1 | 2/2010 | Ritter et al. |
| 7,662,034 B2 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 7,828,135 B2 * | 11/2010 | Fischer et al. ............. 198/678.1 |
| 2001/0023171 A1 | 9/2001 | Hazenbroek et al. |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |
| 2009/0320761 A1 | 12/2009 | Grave et al. |
| 2010/0022176 A1 | 1/2010 | Van De Nieuwelaar et al. |
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn et al. |

FOREIGN PATENT DOCUMENTS

| | | |
|---|---|---|
| EP | 0 444 782 A1 | 9/1991 |
| EP | 0 786 208 A1 | 7/1997 |
| EP | 1 538 113 A1 | 6/2005 |
| EP | 2 181 841 A1 | 5/2010 |
| FR | 2 529 177 A1 | 12/1983 |
| GB | 1 395 722 A | 5/1975 |

OTHER PUBLICATIONS

International Search Report and Written Opinion dated Sep. 15, 2011 for PCT/NL2011/050267.

International Search Report and Written Opinion dated Sep. 15, 2011 for PCT/NL2011/050268.

* cited by examiner

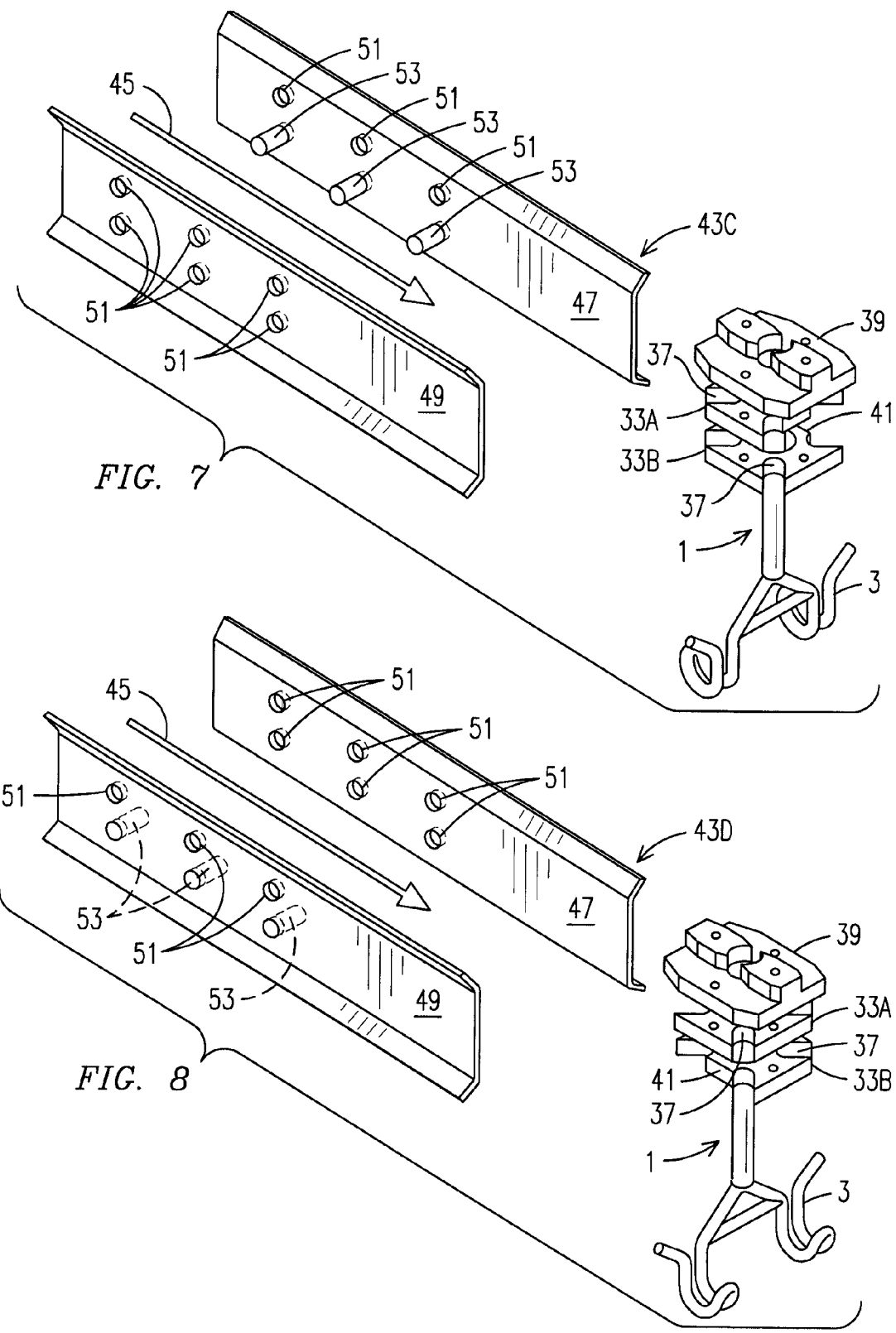

US 8,267,241 B2

ROTATIONALLY INDEXED ARTICLE SUPPORT FOR A CONVEYOR SYSTEM HAVING AN ALIGNMENT STATION

TECHNICAL FIELD

The present disclosure relates generally to article supports for conveyor systems and more particularly to article supports for conveyor systems that include an alignment station for aligning the article supports, and articles supported thereby, in predetermined orientations. More specifically, the disclosure relates to poultry processing systems where the article supports are configured to hold poultry carcasses for movement along a processing path.

BACKGROUND

Conveyor systems having article supports that comprise a trolley and a rotatable article holder or shackle are well known in the poultry processing industry. One suitable example is described in European patent 0786208, which discloses a shackle for suspending poultry by their legs for movement by a conveyor track of a poultry processing line past and through individual processing stations. More specifically, a trolley assembly is supported and guided along a conveyor track and moved therealong by a transport chain. Poultry suspension hooks are rotatably mounted to the trolley and an associated turning gear is adapted to cooperate with turning features along the track to rotate the turning gear and thereby the poultry suspension hooks between predetermined rotary positions or orientations. At the location of individual processing stations, the turning gear is usually retained between opposite parallel side guides to inhibit any rotation when a suspended poultry carcass is being processed at the processing station. In between the processing stations, however, these parallel side guides may be interrupted or otherwise not be present. The side guides are also interrupted where the turning gear is engaged by turning features at a turning station to effect its rotation to a desired orientation.

The turning gear, which is a substantially square body, has slots extending inwardly from its corners. These slots are engageable by turning pins at turning stations positioned along the conveyor path to rotate the turning gear and its associated shackle to a desired orientation. A yieldable indexing arrangement between the trolley and the turning gear ensures that the desired orientation is retained as the assembly moves further along the track. This is of particular importance at locations where the lateral side guides are interrupted. The typical yieldable indexing arrangement includes a spring biased ball and socket assembly with a cavity for holding the ball and spring on one of the relatively rotatable parts and a ball receiving recess or detent on the other relatively rotatable part. The ball snaps into a detent when the turning gear is in predetermined indexed orientations to maintain the turning gear and shackle yieldably in these orientations. Other mechanical arrangements by be used.

The characteristics of mechanical tension springs of these indexing assemblies are not always compatible with the yieldability requirements of rotatable article support assemblies. It is important from a safety perspective, for instance, that the indexing assemblies give way when human beings accidentally obstruct a suspended article moving along the path of conveyance. Thus while relatively firm indexing is required to hold the turning gear and shackle in its indexed orientations, there is also a somewhat conflicting need for relatively forceless disturbance of the turning gear and shackle away from the indexed orientations when accidentally disturbed, and to return them thereafter back to their indexed orientation.

There is therefore a need for an improved article support assembly and aligning station for use in a processing conveyor. In a more general sense there is a need for such a support assembly and aligning station that overcomes or ameliorates at least one of the disadvantages of the prior art. There is a related need for alternative structures which are less cumbersome in assembly and operation and which moreover can be made relatively inexpensively. Alternatively a need exist at least to provide consumers with a useful choice. It is to a method and apparatus that addresses these and other needs that the present invention is primarily directed.

SUMMARY

Briefly described, an article support assembly and a conveyor system is disclosed for conveying articles between processing stations. The article support assembly includes a trolley for engagement with the conveyor and a holder or shackle mounted to the trolley and configured to support an article such as a poultry carcass. The shackle is rotatable with respect to the trolley. A turning block is associated with the shackle and rotation of the turning block with respect to the trolley causes corresponding rotation of the shackle relative to the trolley. A yieldable indexing arrangement is operatively disposed between the trolley and the turning block to define at least a first and a second incremental indexed rotational orientation for the shackle. The yieldable indexing arrangement is biased into operative engagement by magnetic repelling forces.

The article support assembly of this disclosure is more efficient than those of the prior art. It has been found that the magnetic repulsion also better meets the somewhat conflicting requirement of relatively firm retention of the shackle in its indexed orientations and relatively forceless disturbance of the shackle away from the indexed orientations when accidentally engaged by, for instance, a worker. Further advantageous aspects of the invention will become clear from the appended description and in reference to the accompanying drawing figures, which are briefly described as follows.

BRIEF DESCRIPTION OF THE DRAWINGS

FIG. 7 is a perspective view showing a third arrangement of turning pins for obtaining a third output orientation of the article support.

FIG. 8 is a perspective view showing a fourth arrangement of turning pins for obtaining a fourth output orientation of the article support.

DETAILED DESCRIPTION OF EXEMPLARY EMBODIMENTS

Figure 1:
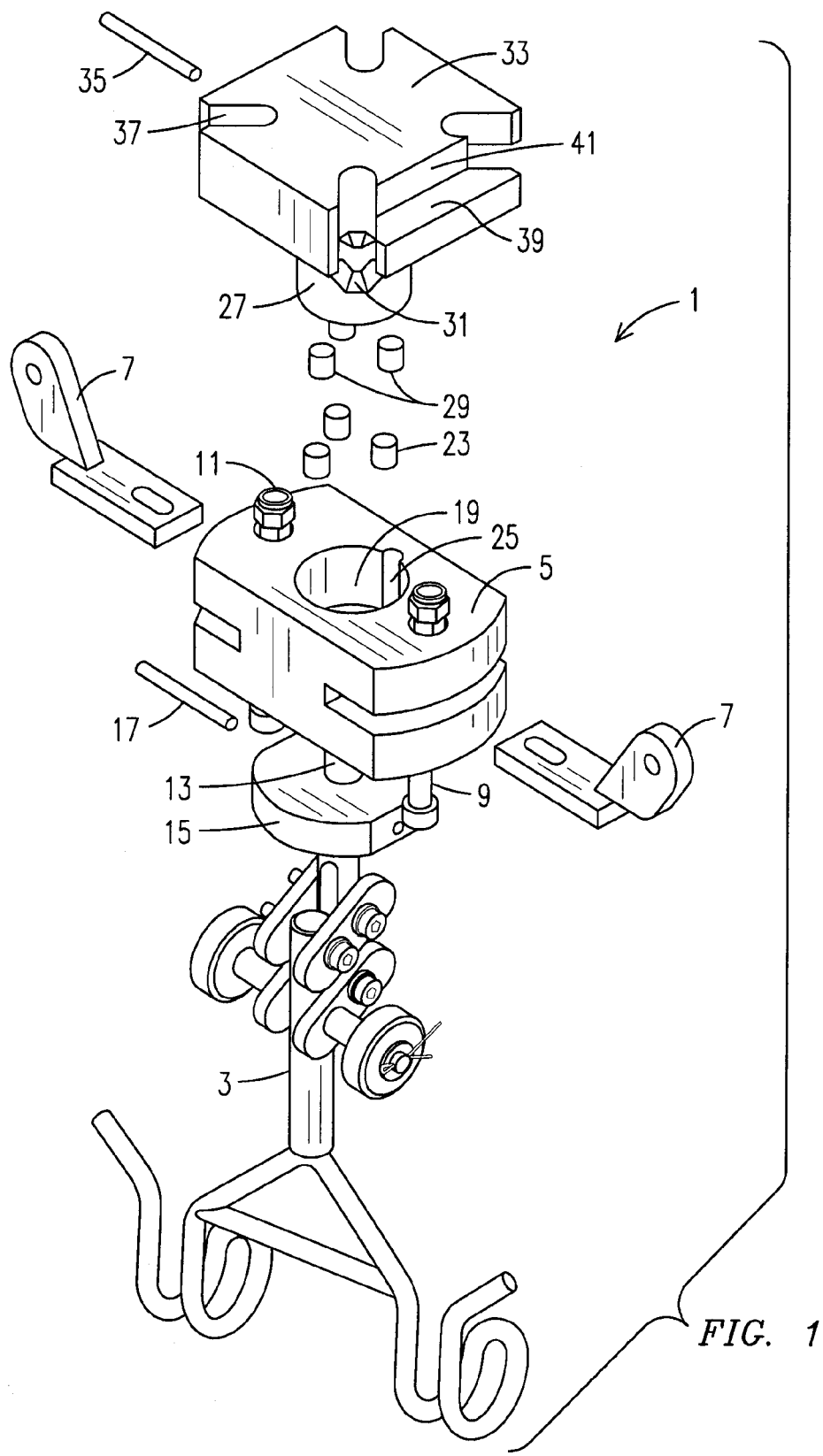
FIG. 1 is an exploded perspective illustration of a rotatable article support that embodies principles of the invention in one preferred embodiment.
Figure 2:
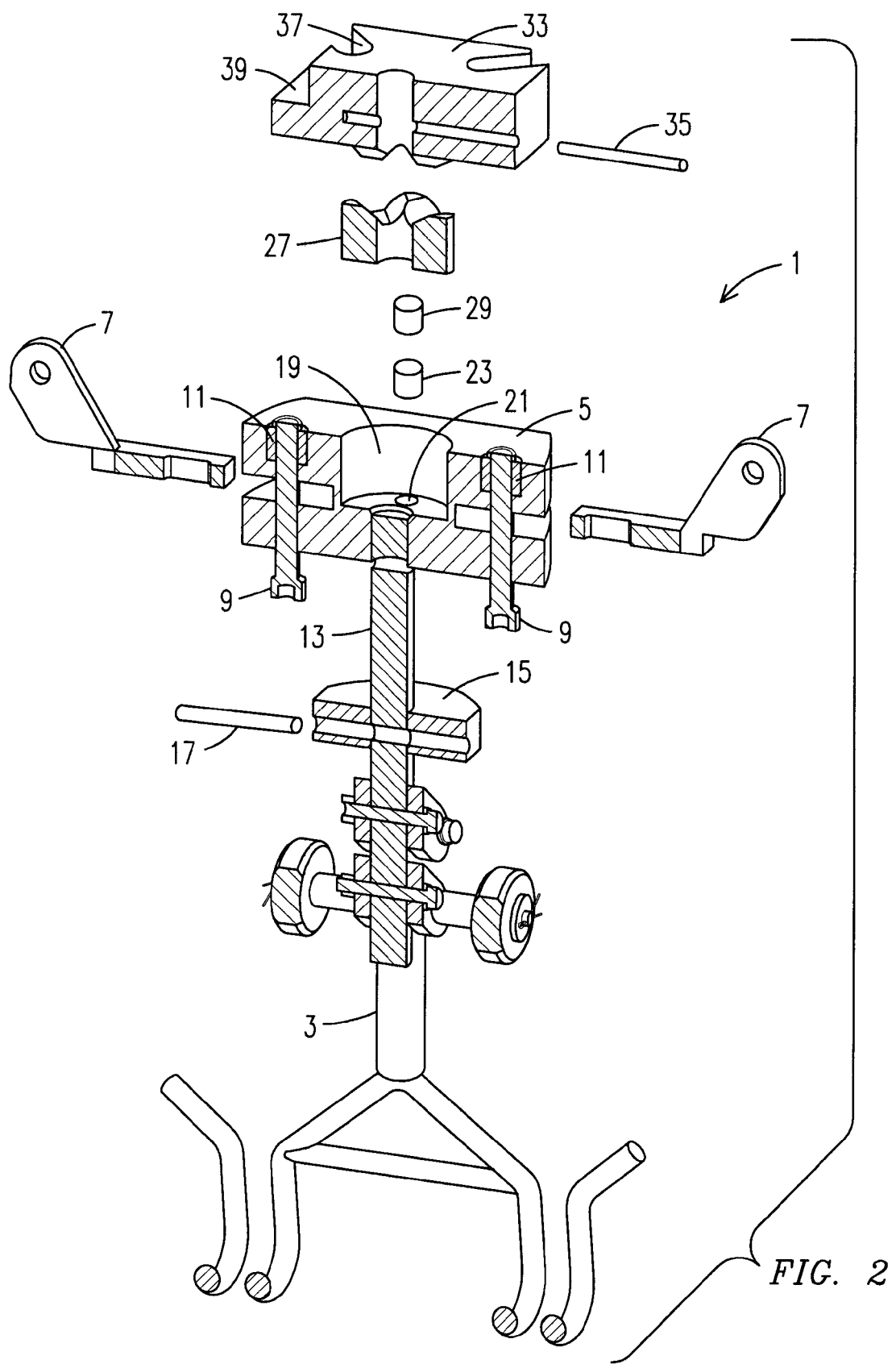
FIG. 2 is a cross section of the exploded perspective illustration of FIG. 1.

Reference will now be made in more detail to the drawing figures, in which like parts may be indicated by like reference numerals throughout the several views. In FIGS. 1 and 2 an exploded and an exploded cross sectional view respectively are presented and show a rotatable article support assembly 1 according to the disclosure. In this example, the article support assembly 1 is configured to suspend poultry carcasses as they are conveyed along a processing path. The article support assembly 1 includes a shackle 3, which in this example is a so called weighing shackle, for the suspension of animal carcasses, such as fowl or poultry carcasses. The shackle 3 is rotatably suspended from a base block 5. The base block 5 is arranged for movement along an overhead conveyor rail or track (not shown, but conventional). Such conveyor rails or tracks are common in industrial apparatuses for carrying out a succession of processing steps. Commonly such conveyor rails are laid out in a continuous loop that defines a path of conveyance along or past or through a plurality of processing stations. Such systems are well known in the meat processing industry, but are also used in other disciplines of industry and manufacture. The base block 5 in the illustrated embodiment thus forms a trolley or carriage that is linked to similar base blocks of adjacent spaced article support assemblies by trolley brackets 7 and chains, or the like (not shown). The trolley brackets 7 are attached to the base block 5 by means of bolts 9 and nuts 11.

Extending upwardly from shackle 3 is a shaft 13 to which an abutment flange 15 is attached by means of a first transverse pin 17. The shaft 13 extends upwardly through a central bore in the base block 5, which central bore is enlarged at the upper end of the base block 5 to form a cavity 19. The cavity 19, as best seen in FIG. 2, has three bores 21 (only one visible in FIG. 2) each configured to receive a lower magnet 23. The cavity 19 has a groove 25 (FIG. 1) for non-rotatably receiving an indexing plunger 27 which has it perimeter adapted to the contour of cavity 19 to inhibit relative rotation but to allow axial movement of the plunger 27.

Figures 3, 4:
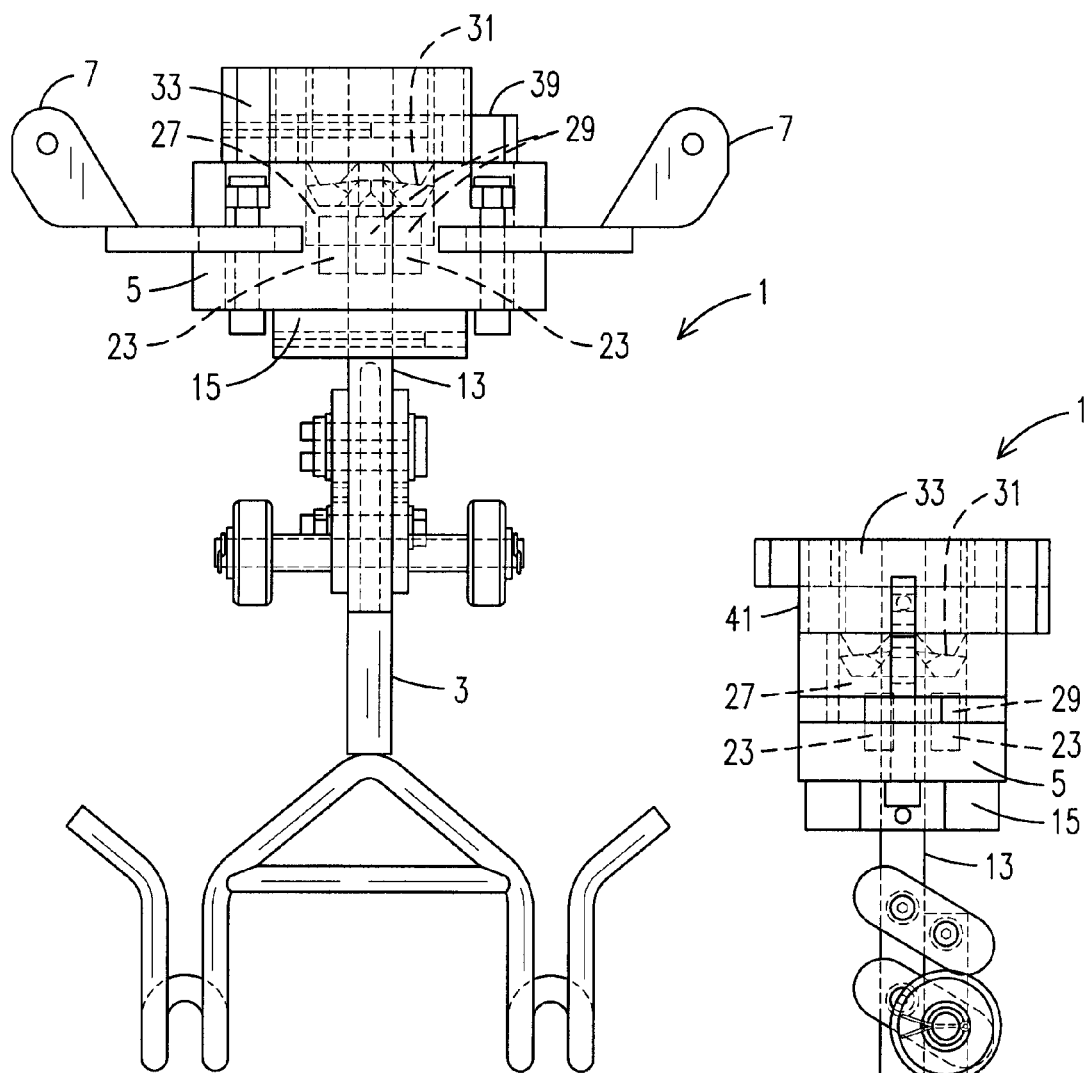
FIG. 3 is a side elevation in ghost view of the article support of FIGS. 1 and 2.
FIG. 4 is a rear elevation in ghost view of the article support of FIGS. 1, 2, and 3.

Not visible in FIGS. 1 and 2, but visible in the ghost views of FIGS. 3 and 4, the indexing plunger 27 has bores opening into its bottom surface for receiving upper magnets 29. In this example the lower magnets 23 are positioned with their north poles on top or facing up and the upper magnets 29 are positioned with their north poles facing down. In such an orientation, the lower and upper magnets 23, 29 will repulse or repel one another when they are in or near aligned positions. Thus, the indexing plunger is urged upwardly within the cavity 19 when the magnets are near or in alignment with one another and further are urged upwardly with the maximum force with the magnets are in precise alignment with the repulsive forces falling off as the magnets move progressively away from precise alignment.

The indexing plunger 27 carries on its upper surface a number of radial indexing formations or features 31, which are configured to cooperate with complementary indexing formations or features on a lower face of a turning gear or turning block 33. The indexing formations on the indexing plunger and turning block are configured to mesh and yieldably lock together when the plunger and turning block are in predetermined rotary orientations with respect to each other. In this example, the indexing formations 31 provide for four yieldably locked rotational orientations that are 90° apart, although other configurations are possible as may be dictated by application specific requirements.

The turning block 33 is mounted to the shaft 13 by means of a second transverse pin 35. Spacing between transverse bore in the shaft 13 for receiving the first and second transverse pins 17, 35 is such that the base block 5 is snugly and rotatably received between the abutment flange 15 and the turning block 33. Thereby also the indexing plunger 27 is held or captured within the cavity 19 of the base block 5 against the repulsive forces of the confronting lower and upper magnets 23, 29. The magnets 23, 29 are preferably sintered rare earth magnets that may contain neodymium or be ceramic magnets of ferrous material. Another suitable magnet material may be samarium cobalt.

The polarity and strength of the lower and upper magnets 23, 29 should be sufficient to obtain the repulsive force necessary to bias the indexing formation 31 into engagement with the turning block 33. This can be achieved with the north poles of confronting magnets facing one another, but may also be achieved by having the south poles facing one another. The important aspect is that like poles of confronting magnets are facing one another. The turning block 33 further has diagonal slots 37 extending diagonally inwardly from each corner of the substantially square contour of the turning block 33. As described above, these diagonal slots are configured to be engaged by pins or other features of a turning station as the turning block is conveyed through the turning station to move the turning block and shackle between its indexed orientations to a desired orientation.

In FIGS. 3 and 4, a side and a rear elevation of the assembled article support assembly 1 are illustrated as ghost views; i.e. with internal surfaces and parts shown in phantom line. Accordingly, internal parts like the magnets 23, 29, the indexing plunger 27 and the indexing formations 31 are visible as if the base block 5 and the turning block 33 were of transparent material. Also best visible in FIGS. 3 and 4 is that the turning block 33 has an upper cut-out 39 along one edge extending between adjacent slots 37, as well as a lower cut-out 41 along another edge that is perpendicular to the one edge. The turning block may thus be said to be truncated along that edge.

The purpose of the upper and lower cut-outs will now be described with particular reference to FIGS. 5 to 8. In FIGS. 5 to 8 several possible output orientations are shown for the article support assembly 1 after having passed through a selectively configured aligning, or turning station 43A, 43B, 43C, 43D in a direction of conveyance indicated by arrow 45. The representation of FIGS. 5 to 8 is essentially schematic and structure that is not directly relevant to a correct understanding of the disclosure is omitted for clarity. Also the article support assembly 1 is shown in a simplified form with the turning block 33 separated in two levels of disks 33A, 33B to better visualize the upper and lower cut-outs 39, 41 defining the truncated sides.

Figure 5:
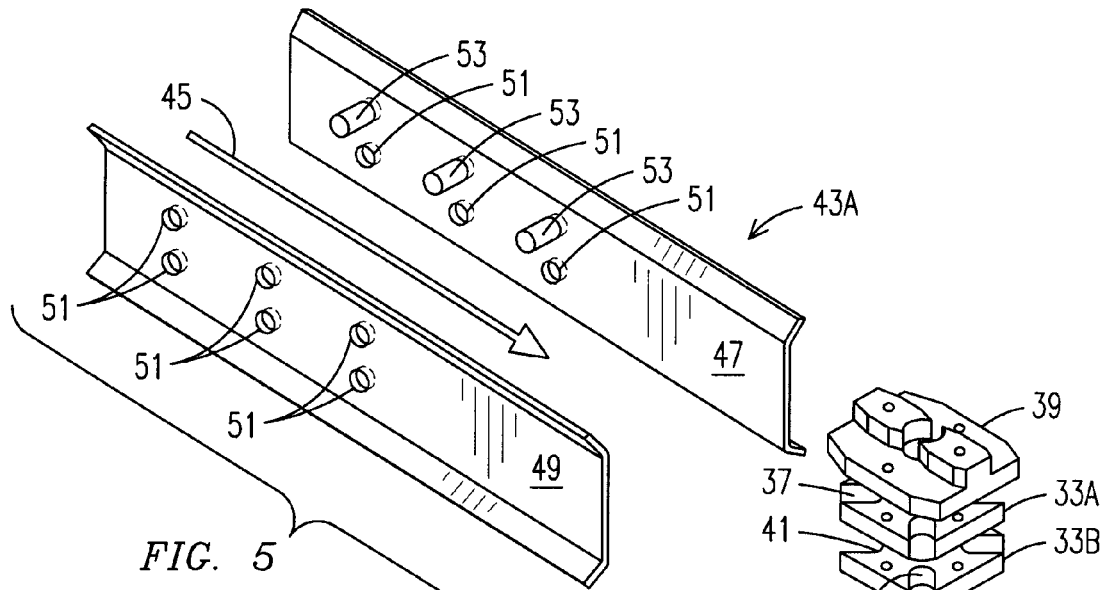
FIG. 5 is a perspective view showing a first arrangement of turning pins for obtaining a first output orientation of the article support.

Each of the turning stations 43A-43D has opposed left and right hand guiding walls 47, 49. Each right hand guiding wall 47, 49 has a series of openings 51 in an upper and a lower row, each consisting of three openings. Each opening 51 is adapted to receive selectively a turning pin 53. As shown in FIG. 5, three turning pins 3 are successively arranged in the upper row of openings 51 of the left hand guiding wall 47. Irrespective of the rotational position of the article support assembly 1 when it enters the turning station 43A, the three successive turning pins 53 in the upper row will always be sufficient to engage as many of the diagonal slots 37 as is necessary to bring the upper cut-out 39 (in level 33A of the turning block) into a position facing the left hand guide rail 47, once it has passed all three turning pins 53.

Figure 6:
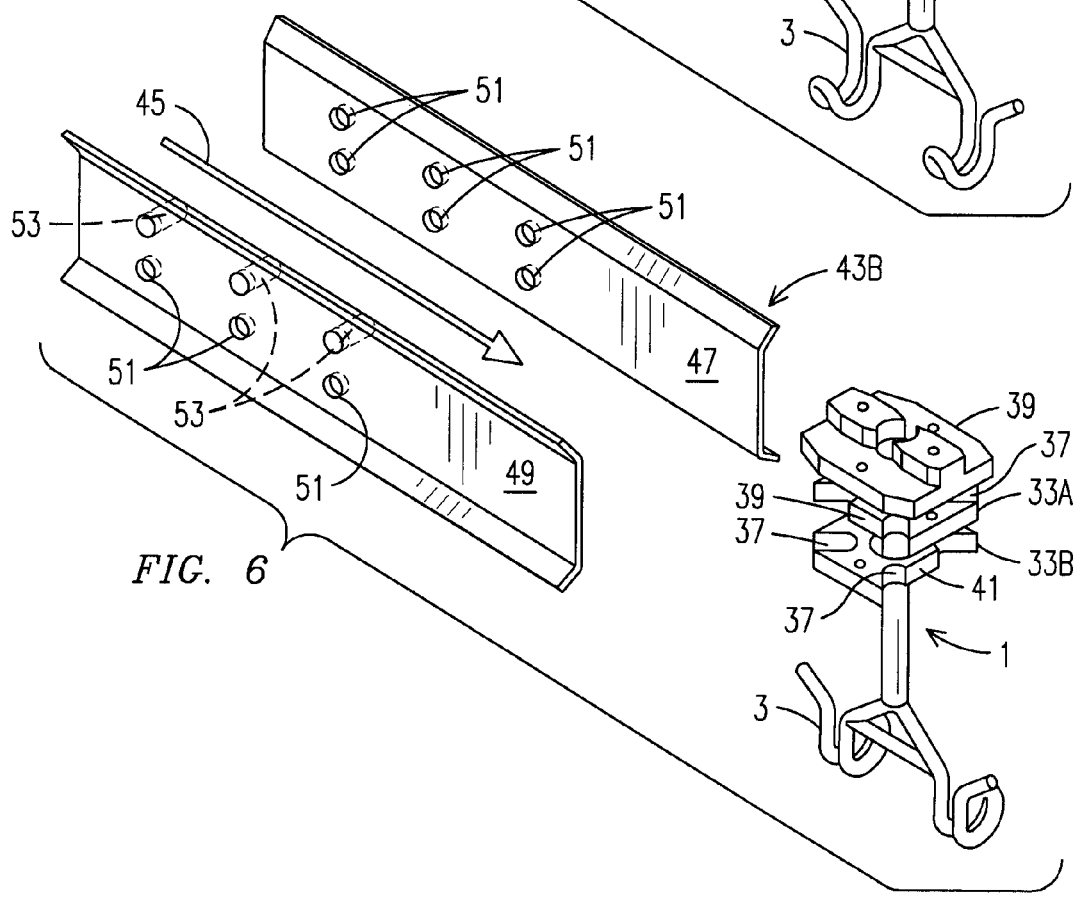
FIG. 6 is a perspective view showing a second arrangement of turning pins for obtaining a second output orientation of the article support.

As shown in FIG. 6, three turning pins 53 are now mounted in the upper row of three openings 51 of the right hand guiding wall 49. This has the effect that article supported assembly 1 will now always leave the turning station 43B with the upper cut-out 39 facing the right hand guiding wall 49. This results in a different orientation of the shackle 3 than that achieved with the turning station 43A configured as shown in FIG. 5.

In FIG. 7 again a different arrangement or configuration of turning station 43C is shown. In this variation the three successive turning pins 53 are positioned in the lower row of openings 51 of the left hand guiding wall 47. The pins 53 now engage the diagonal slots 37 at the lower portion 33B of the turning block. Upon passage of the article support assembly 1 through the turning station 43C in the direction 45 of conveyance, the lower cut-out 41 will emerge always from the turning station 43C, facing the left hand guide wall 47.

In a further variation according to FIG. 8, the turning station 43D has the successive turning pins 53 installed on the lower row of openings 51 in the right hand guide wall 49. This results in the lower cut-out 41 of the lower portion 33B of the turning block emerging always from the turning station 43D facing the right hand side wall 49.

It will thus be seen that the turning station may be configured as needed such that the shackle 3, and a carcasses suspended therefrom, emerges from the turning station in any desired one of four orientations that are 90° apart with respect to each other. Thus, the carcass can be rotated to the orientation that it needs to be in prior to engaging one of the successive processing stations of a poultry processing line. This is enabled at least in part by the two levels of turning pins that cooperate with corresponding portions (upper and lower) of the turning block to obtain the desired indexed orientation each time.

As the turning block is moved from one indexed orientation to another, the indexing formations 31 on the indexing plunger 27 are progressively moved out of precise engagement with the corresponding mating formations on the bottom of the turning block 33. As this occurs, the indexing plunger is urged downwardly by the relatively moving formations into the cavity 19 against the repulsive forces of the magnets, which are still in near alignment with each other but becoming progressively misaligned. When the rotation of the turning block moves beyond about 45°, the indexing formations of the indexing plunger begin to move progressively into mating engagement with the next adjacent mating formations on the bottom of the turning block. At this point, the upward forces applied to the indexing plunger by the repulsion of the magnets urges the indexing plunger upwardly with a force sufficient to snap the indexing formations and the mating formations into mating alignment. Thus, the turning block and shackle snap to their next indexed orientation after having been rotated about half way to that position.

By the same token, if the shackle or a carcass suspended therefrom is accidently disturbed away from an indexed orientation through less that about 45° by, for instance, a worker in the processing path, the repulsive forces supplied by the magnets will cause the turning block and shackle to snap back to the indexed orientation by the same mechanism. However, as the magnets move further out of precise alignment, the repulsive force that they impart is reduced proportionally. Thus, resistance to the disturbance is significantly reduced to accommodate the disturbance in a relatively forceless way so as not to injure the worker or damage components of the machine. When the indexing features are in precise alignment, the magnets may be arranged to be more closely aligned to provide greater repulsive force to obtain a firm mating engagement of the indexing features. This functionality is not present in prior art indexing systems using springs, balls, detents, and the like. It has been found that this arrangement accommodates well the somewhat conflicting needs to provide for indexed orientations that are firmly maintained yet provide for a relatively forceless disturbance away from an indexed orientation, and an automatic return thereto, in the event of an accidental contact.

Accordingly an article support assembly 1 is disclosed that is adapted for movement by a conveyor along a path of conveyance. The article support assembly 1 includes a trolley 5 for engagement by the conveyor and a shackle 3 configured to support an article, and rotatable with respect to the trolley. A turning block 33 is associated with the shackle 3, and rotation of the turning block with respect to the trolley 5 causes corresponding rotation of the shackle relative to the trolley. Yieldable indexing features 23, 27, 29, 31 are operatively arranged between the trolley 5 and the turning block 33 to define at least a first and a second incremental rotational orientation or position for the shackle 3. The yieldable indexing features 23, 27, 29, 31 of the article support assembly 1 are biased into engagement by magnetic repelling forces provided by magnets with like poles arranged to confront one another when in or near alignment. A conveyor system for conveying articles along processing stations is adapted to include the article support assembly 1 and comprises a turning station 43A, 43B, 43C, 43D for giving a predetermined rotational position to the shackle 3 with respect to the trolley 5.

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the scope of the invention. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Additions, deletions, and modifications within the purview of the skilled person may generally be made without departing from the spirit and scope of the invention, which is determined only by the claims.

What is claimed is:

1. An article support assembly for movement by a conveyor along a path of conveyance, including:
   a trolley for engagement by the conveyor;
   a shackle configured to support an article, and rotatable with respect to the trolley;
   a turning block associated with the shackle, rotation of the turning block with respect to the trolley causing corresponding rotation of the shackle relative to the trolley;
   a yieldable indexing feature operatively arranged between the trolley and the turning block to define at least a first and a second incremental rotational orientation for the shackle, and magnets associated with the yieldably indexing feature and arranged to urge the indexing feature into yieldable locked configurations through magnetic repulsion.

2. An article support assembly according to claim 1, wherein the magnets comprise a lower magnet and an upper magnet arranged to confront one another, the lower and upper magnets being positioned and oriented so that like poles of confronting magnets oppose one another when the shackle is in an incremental rotational orientation.

3. Article support assembly according to claim 1, wherein the turning block has a substantially rectangular perimeter contour with diagonal slots extending radially inwardly from each corner, and further comprising an upper cut-out along one perimeter edge extending between adjacent slots, and a lower cut-out extending along another perimeter edge that is substantially perpendicular to the one perimeter edge.

4. An article support assembly according to claim 1, wherein the yieldable indexing feature defines a total of four indexing positions.

5. An article support assembly according to claim 2, wherein the yieldable indexing feature comprises three confronting pairs of lower and upper magnets in a spaced arrangement.

6. An article support assembly according to claim 1, wherein the shackle is adapted to support a poultry carcass.

7. A conveyor system for conveying articles along processing stations including an article support assembly in accordance with claim 3 and a turning station.

8. The conveyor system according to claim 7, wherein the turning station includes a succession of three turning pins positioned to engage a predetermined selection of diagonal slots of the turning block as well as allowing passage of at least one of the upper and lower cut-outs.

9. A conveyor according to claim 8, wherein the turning pins are selectively mountable in upper and lower rows of openings provided in one of a right hand and left hand guide wall.

10. An article support assembly for attachment to a conveyor extending along a processing path, the article support assembly comprising:
   a trolley securable to the conveyor;
   a shackle rotatably secured with respect to the trolley and configured to support an article;
   an indexing arrangement associated with the shackle and configured to maintain the shackle yieldably in at least a first and a second indexed rotational orientation relative to the processing path;
   the indexing arrangement comprising confronting surfaces rotatable with respect to each other and having surface features that mate when the shackle is in the first and the second indexed rotational orientations; and
   magnets associated with the indexing arrangement, the magnets being positioned and oriented to urge the confronting surfaces toward one another through magnetic force when the shackle is in the first and the second indexed rotational orientations.

11. The article support assembly of claim 10 and wherein the magnetic force is a repulsive magnetic force.

12. The article support assembly of claim 10 and further comprising a turning block associated with the shackle, rotation of the turning block relative to the trolley causing corresponding rotation of the shackle relative to the trolley.

13. The article support assembly of claim 12 and wherein the indexing arrangement is disposed between the turning block and the trolley.

* * * * *